United States Patent
Hasegawa

(10) Patent No.: US 8,765,324 B2
(45) Date of Patent: Jul. 1, 2014

(54) METHOD FOR MANUFACTURING MEMBRANE ELECTRODE ASSEMBLY AND SOLID POLYMER ELECTROLYTE FUEL CELL

(75) Inventor: Shigeki Hasegawa, Gotemba (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 13/521,945

(22) PCT Filed: Jan. 18, 2011

(86) PCT No.: PCT/JP2011/050723
§ 371 (c)(1),
(2), (4) Date: Jul. 12, 2012

(87) PCT Pub. No.: WO2012/098640
PCT Pub. Date: Jul. 26, 2012

(65) Prior Publication Data
US 2013/0288152 A1    Oct. 31, 2013

(51) Int. Cl.
*H01M 8/10* (2006.01)
*H01M 4/88* (2006.01)

(52) U.S. Cl.
CPC ............. *H01M 8/10* (2013.01); *H01M 4/8896* (2013.01); *H01M 4/8814* (2013.01); *H01M 8/1004* (2013.01); *Y02E 60/521* (2013.01); *H01M 4/8892* (2013.01); *H01M 2008/1095* (2013.01)
USPC .......................................... 429/482; 429/535

(58) Field of Classification Search
USPC ........... 429/482, 483, 535; 427/115; 977/742, 977/743, 750, 752, 753, 948; 156/246
See application file for complete search history.

(56) References Cited

U.S. PATENT DOCUMENTS

| | | | |
|---|---|---|---|
| 2002/0177032 A1 | 11/2002 | Suenaga et al. | |
| 2004/0241532 A1* | 12/2004 | Kim ............................... | 429/44 |
| 2006/0115711 A1 | 6/2006 | Kim et al. | |
| 2006/0115712 A1 | 6/2006 | Kim et al. | |
| 2009/0117434 A1 | 5/2009 | Liu et al. | |
| 2009/0117437 A1 | 5/2009 | Liu et al. | |
| 2010/0075201 A1* | 3/2010 | Nakanishi et al. ............. | 429/40 |

FOREIGN PATENT DOCUMENTS

| | | |
|---|---|---|
| JP | 2002-298861 A | 10/2002 |
| JP | 2005-294109 A | 10/2005 |

(Continued)

OTHER PUBLICATIONS

International Search Report for PCT/JP2011/050723 dated May 10, 2011.

*Primary Examiner* — Patrick Ryan
*Assistant Examiner* — Haixia Zhang
(74) *Attorney, Agent, or Firm* — Sughrue Mion, PLLC

(57) ABSTRACT

The present invention relates a method for manufacturing a fuel cell. An object of the present invention is to provide a method for manufacturing a membrane electrode assembly capable of solving an electrical connection problem caused by uneven tube lengths and improving an output, and a solid polymer electrolyte fuel cell. The method for manufacturing the membrane electrode assembly of the present invention includes a seed catalyst layer forming process (1), a CNT growing process (2), a CNT entanglement promoting process (3), a catalyst carrying process (4), an ionomer arranging process (5), and a transferring (MEA conversion) process (6). According to the present invention, entanglement of adjacent CNTs can be promoted by the CNT entanglement promoting process (3) and therefore the electrical connection of the CNTs can be ensured. Thus, the output of the cell can be improved.

6 Claims, 10 Drawing Sheets

(56) References Cited

FOREIGN PATENT DOCUMENTS

| JP | 2006-156366 A | 6/2006 |
|---|---|---|
| JP | 2006-156387 A | 6/2006 |
| JP | 2007-257886 A | 10/2007 |
| JP | 2008-59841 A | 3/2008 |
| JP | 2009-117354 A | 5/2009 |
| JP | 2009-117364 A | 5/2009 |
| JP | 2010-218820 A | 9/2010 |

* cited by examiner

METHOD FOR MANUFACTURING MEMBRANE ELECTRODE ASSEMBLY AND SOLID POLYMER ELECTROLYTE FUEL CELL

CROSS REFERENCE TO RELATED APPLICATIONS

This application is a National Stage of International Application No. PCT/JP2011/050723 filed Jan. 18, 2011, the contents of which are incorporated herein by reference in their entirety.

TECHNICAL FIELD

The present invention relates to a method for manufacturing a membrane electrode assembly (hereinafter referred to as "MEA") and a solid polymer electrolyte fuel cell (hereinafter referred to as "fuel cell"). More specifically, the present invention relates to a method for manufacturing a MEA including an electrode having a carbon nanotube (hereinafter referred to as "CNT") and a solid polymer electrolyte membrane (hereinafter referred to as "electrolyte membrane"), and a fuel cell.

BACKGROUND ART

Conventionally, a fuel cell including an anode electrode to which fuel as such as hydrogen is supplied, a cathode electrode to which oxidant gas such as air is supplied, and an electrolyte membrane which is sandwiched between these electrodes has been commonly known. During power generation of the fuel cell, a reaction takes place that produces protons and electrons from hydrogen molecules at the anode electrode ($H_2 \rightarrow 2H^+ + 2e^-$). The protons produced at the anode electrode are moved to the cathode electrode through the electrolyte membrane. On the other hand, the electrons are moved to the cathode electrode through an external circuit. Then, at the cathode electrode, a reaction takes place that produces water from the protons, the electrons, and oxygen in air ($4H^+ + O_2 + 4e^- \rightarrow 2H_2O$).

As such a fuel cell, for example, Patent Literature 1 discloses using a spiral CNT at a cathode electrode. A plurality of spiral CNTs are provided on a surface of an electrolyte membrane. Each spiral axis is disposed vertical to the surface of the electrolyte membrane. Accordingly, during power generation of the fuel cell, a current can flow in the direction of the spiral axis. Thus, the spiral CNT can function like a coil to form a magnetic field at the center of each spiral CNT, and therefore paramagnetic oxygen molecules can be easily attracted.

Also, for example, Patent Literature 2 discloses two methods for manufacturing a fuel cell comprising inclining a linear CNT and transferring it onto a surface of an electrolyte membrane. The first method is as follows. Firstly, a plurality of linear CNTs are grown vertically on a surface of a silicon substrate. Next, electrode catalysts are carried on the linear CNTs. Then, an ionomer solution is applied onto the surfaces of the linear CNTs. Subsequently, the growing ends of the linear CNTs and the surface of the electrolyte membrane are positioned opposite to each other. By applying a predetermined pressure between the linear CNTs and the electrolyte membrane, an inclined angle of each linear CNT is adjusted to connect the growing ends of the linear CNTs and the surface of the electrolyte membrane. Finally, the silicon substrate is removed to transfer the linear CNTs.

The second method is basically the same as the first method. However, the second method is different from the first method in that a process for providing ionomers on the surfaces of the linear CNTs and a process for connecting the linear CNTs and the electrolyte membrane are replaced. In other words, processes before carrying the electrode catalysts on the liner CNTs in the second method are the same those in the first method. In the second method, the linear CNTs and the electrolyte membrane are connected after the electrode catalysts are carried on the linear CNTs. Subsequently, the ionomers are provided on the surfaces of the linear CNTs. Finally, the linear CNTs are transferred by removing the silicon substrate.

CITATION LIST

Patent Literature

Patent Literature 1: Japanese Patent Laid-Open No. 2005-294109
Patent Literature 2: Japanese Patent Laid-Open No. 2007-257886
Patent Literature 3: Japanese Patent Laid-Open No. 2006-156387
Patent Literature 4: Japanese Patent Laid-Open No. 2006-156366
Patent Literature 5: Japanese Patent Laid-Open No. 2002-298861

SUMMARY OF INVENTION

Technical Problem

However, the spiral CNTs disclosed in Patent Literature 1 are difficult to be grown while aligning the lengths of the tubes, which easily causes unevenness of the tube lengths. When the tube lengths are uneven, a CNT having short tube length may be grown between CNTs having long tube length. Accordingly, the CNT having short tube length is not electrically connected to the external circuit and therefore a current cannot flow in the direction of the spiral axis of the CNT. Thus, the magnetic field is not sufficiently formed. Similarly, the linear CNTs disclosed in Patent Literature 2 are also difficult to be grown while aligning the lengths of the tubes. Accordingly, similarly to the spiral CNTs, the current cannot flow in the axial direction. Thus, the function of the electrode catalysts carried by the CNTs cannot be used. In other words, the rate of utilization of the catalysts is reduced.

According to the manufacturing methods disclosed in Patent Literature 2, the linear CNTs can be inclined and transferred onto the electrolyte membrane. Thus, the lengths of the CNTs in the transferring direction can be shortened by appearance. FIG. 10 is an illustration for explaining an electrode structure of the fuel cell obtained by the first method disclosed in Patent Literature 2. As shown in FIG. 10, the lengths of linear CNTs 54a to 54d are different. However, by inclining the CNTs 54a to 54d on a surface of an electrolyte membrane 52, a linear distance from the electrolyte membrane 52 to a gas diffusion member 60 can be shortened. Thus, a distance between the CNT 54d having the shortest tube length and the conductive gas diffusion member 60 can be shortened.

However, according to the first method disclosed in Patent Literature 2, ionomers 58 are provided on the surfaces of the CNTs 54a to 54d before the CNTs 54a to 54d are brought into contact with the electrolyte membrane 52. Accordingly, a pressure is applied to the CNTs 54a to 54d covered with the ionomers 58 when they are brought into contact. Therefore, as shown in FIG. 10, the ionomers 58 are intervened between the CNT 54*d* and the CNT 54*c*. Thus, the electrical connection between the CNT 54*d* and the gas diffusion member 60 is not sufficient.

On the other hand, according to the second method disclosed in Patent Literature 2, the ionomers 58 are provided on the surfaces of the CNTs 54*a* to 54*d* after the CNTs 54*a* to 54*d* are brought into contact with the electrolyte membrane 52. Therefore, for example, the electrical connection between the CNT 54*d* and the gas diffusion member 60 can be ensured via the CNT 54*c* by bringing the CNT 54*d* into contact with the CNT 54*c*. However, it is difficult to sufficiently ensure the electrical connection of all CNTs by inclining the CNTs.

Further, according to the second method, the ionomers 58 are provided on the surfaces of the CNTs 54*a* to 54*d* using a wet method or dry method such as a dropping method and an immersion method. However, the segregation of the ionomers 58 occurs easily under the dropping method and thus the surfaces of the CNTs are highly likely to not be sufficiently covered. Also, by the immersion method, the ionomers 58 may be attached to a side surface of the electrolyte membrane 52 onto which the CNTs are not transferred and thus the membrane may be thickened. Thus, an output of the fuel cell may be reduced. In addition, the electrolyte membrane is damaged by the dry method and thus not only the output of the fuel cell but also durability is highly likely to be reduced.

The present invention has been made to solve the above-described problems. An object of the present invention is to provide a method for manufacturing a MEA capable of solving an electrical connection problem caused by uneven tube lengths and improving an output of a fuel cell, and the fuel cell.

Means for Solving the Problem

To achieve the above mentioned purpose, a first aspect of the present invention is method for manufacturing a membrane electrode assembly comprising:

a carbon nanotube preparing step for preparing a plurality of carbon nanotubes which are grown to be vertical to a planar direction of a base material;

a catalyst carrying step for causing the carbon nanotubes to carry catalysts after the carbon nanotube preparing step;

an ionomer arranging step for arranging ionomers on surfaces of the carbon nanotubes to cover the catalysts and the carbon nanotubes after the catalyst carrying step;

a first pressure applying step for applying a first pressure required for connecting the carbon nanotubes and a solid polymer electrolyte membrane therebetween by placing growing ends of the carbon nanotubes and the solid polymer electrolyte membrane to be opposite to each other after the catalyst carrying step or the ionomer arranging step; and a base material removing step for removing the base material after the first pressure applying step;

wherein:

the method for manufacturing a membrane electrode assembly further comprising:

a second pressure applying step for applying a second pressure required for forming a connecting point between two adjacent carbon nanotubes out of the carbon nanotubes in a tube length direction of the carbon nanotubes after the carbon nanotube preparing step and at least before the first pressure applying step.

A second aspect of the present invention is the method for manufacturing the membrane electrode assembly according to the first aspect, wherein the second pressure applying step is carried out after the carbon nanotube preparing step and before the catalyst carrying step.

A third aspect of the present invention is the method for manufacturing the membrane electrode assembly according to the second aspect, wherein the second pressure is released after a set time which is predetermined as a time required for securing the formed connecting point.

A forth aspect of the present invention is the method for manufacturing the membrane electrode assembly according to the first aspect or the second aspect, wherein the second pressure applying step is a step for applying the second pressure and a pressure lower than the second pressure alternately in the tube length direction.

A fifth aspect of the present invention is the method for manufacturing the membrane electrode assembly according to the first aspect or the second aspect, wherein the second pressure is released after the ionomer arranging step.

A sixth aspect of the present invention is the method for manufacturing the membrane electrode assembly according to any one of the first aspect to the fifth aspect, wherein each of the carbon nanotubes has a spiral structure with the tube length direction as an axis.

A seventh aspect of the present invention is a solid polymer electrolyte fuel cell comprising a membrane electrode assembly manufactured by the manufacturing method according to any one of the first aspect to the fifth aspect.

Advantageous Effects of Invention

According to the first aspect of the invention, the second pressure is applied in the tube length direction of the CNTs at least before the first pressure is applied. Accordingly, the connecting point can be formed between two adjacent CNTs out of the plurality of CNTs at least before the CNTs and the electrolyte membrane are connected. Therefore, even when the tube lengths of the CNTs which are grown to be vertical to the planar direction of the base material are uneven, the CNTs having short tube length is reliably connected electrically to an external circuit via the CNTs having long tube length for transferring onto the electrolyte membrane. Thus, the fuel cell output can be improved.

Since the electrode catalysts are carried on the surfaces of the CNTs, the catalysts in the vicinity of the connecting point between the CNTs may be clogged by the CNTs and may not be able to be used when the second pressure is applied after the electrode catalysts are carried. From this aspect, according to the second aspect of the invention, the second pressure is applied before the electrode catalysts are carried. Therefore, the electrode catalysts can be carried by the CNTs after the connecting point is formed between the CNTs. Thus, the electrode catalysts can be effectively utilized and the fuel cell output can be further improved.

According to the third aspect of the invention, the second pressure is released after the elapse of the set time which is predetermined as the time required for securing the connecting point between the CNTs, and the electrode catalysts can be carried after the second pressure is released. Therefore, the work can be facilitated as compared with when the electrode catalysts are carried while the pressure is applied, and the manufacturing cost can be reduced.

According to the forth aspect of the invention, the second pressure and the pressure lower than the second pressure are alternately applied in the tube length direction of the CNTs in the second pressure applying step. Therefore, a formation state of the connecting point between the CNTs can be confirmed while the pressure lower than the second pressure is applied. Thus, variations in products can be reduced as compared with when the second pressure is applied.

According to the fifth aspect of the invention, the second pressure is released after the ionomer arranging step. Therefore, the connecting point formed by applying the second pressure can be secured by the ionomers. Thus, the connecting point can be secured for a short time and the productivity can be improved.

According to the sixth aspect of the invention, the CNTs having the spiral structure with the tube length direction as the axis are used. Therefore, a plurality of connecting points can be formed between the adjacent CNTs when the second pressure is applied. Thus, the electrical connection between the CNTs having short tube length and the external circuit can be favorably ensured.

According to the seventh aspect of the invention, a fuel cell capable of solving an electrical connection problem caused by uneven tube lengths and improving cell output can be provided.

BEST MODE FOR CARRYING OUT THE INVENTION

First Embodiment

[Structure of Fuel Cell]

Figure 1:
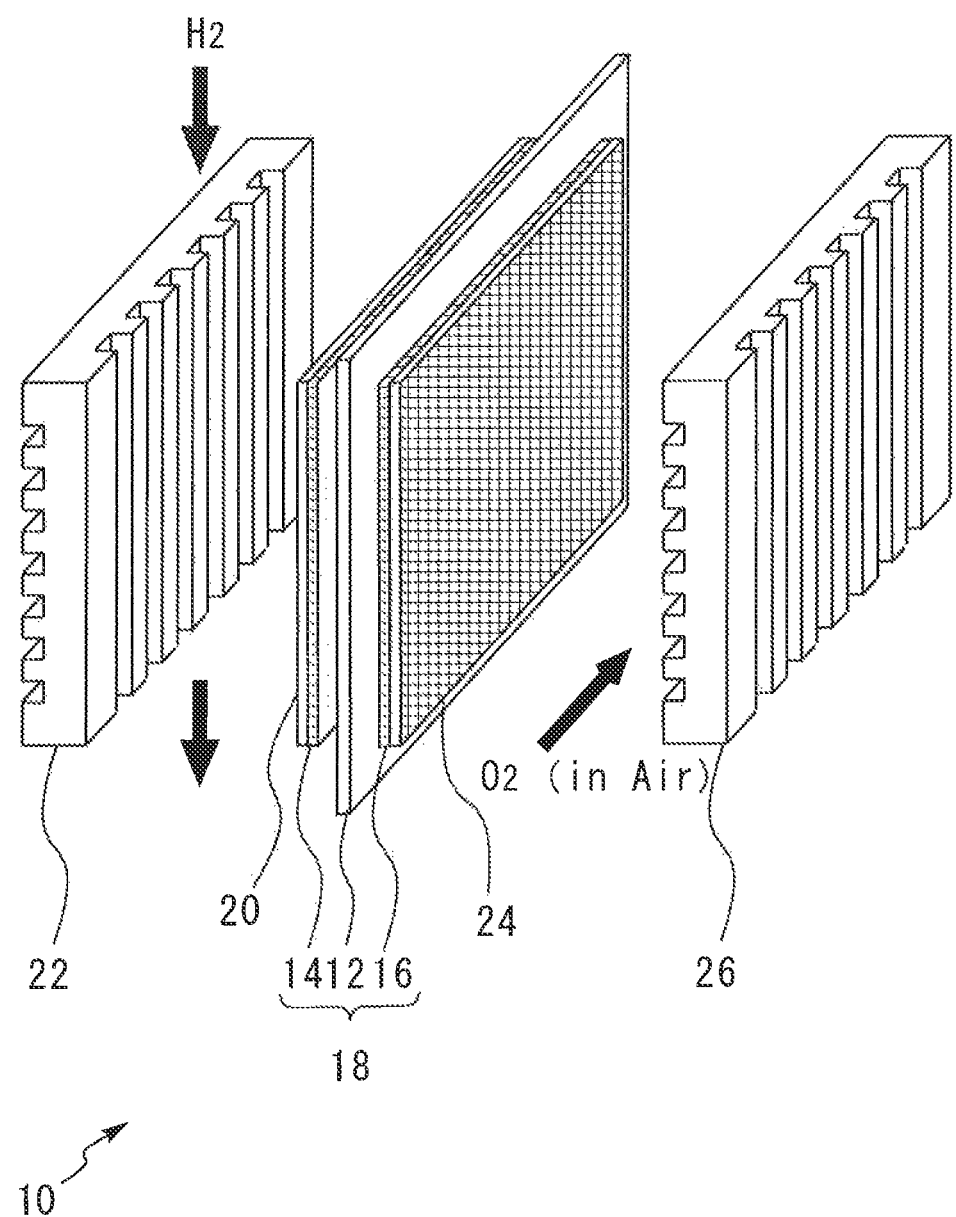
FIG. 1 is a schematic view showing a cross-sectional structure of a fuel cell 10 manufactured according to the first embodiment.

Firstly, a first embodiment of the present invention will be explained below with reference to FIGS. 1 to 8. A structure of a fuel cell will be explained with reference to FIG. 1. FIG. 1 is a schematic view showing a cross-sectional structure of a fuel cell 10 manufactured according to the first embodiment. As shown in FIG. 1, the fuel cell 10 includes an electrolyte membrane 12. For example, the electrolyte membrane 12 is formed from perfluorosulfonic acid resin. An anode electrode 14 and a cathode electrode 16 are provided on both sides of the electrolyte membrane 12 to sandwich the electrolyte membrane 12. Specific structures of the anode electrode 14 and the cathode electrode 16 will be explained later. An MEA 18 is provided by the electrolyte membrane 12, and a pair of the anode electrode 14 and the cathode electrode 16 which sandwich the electrolyte membrane 12.

A gas diffusion layer (hereinafter referred to as "GDL") 20 is provided on the outer side of the anode electrode 14. The GDL 20 is formed from a porous material such as a carbon paper, a carbon cloth, and a metal porous body, and has a function for uniformly diffusing gas supplied from a separator 22 side to the anode electrode 14. Similarly, a GDL 24 is provided on the outer side of the cathode electrode 16. The GDL 24 has a function for uniformly diffusing gas supplied from a separator 26 side to the cathode electrode 16. In FIG. 1, one group of the MEA 18, the GDLs 20 and 24, and the separators 22 and 26, which are configured as described above, is shown. However, the actual fuel cell has a stack structure in which a plurality of MEAs 18 and GDLs 20 and 24 are stacked via the separators 22 and 26.

Figure 2:
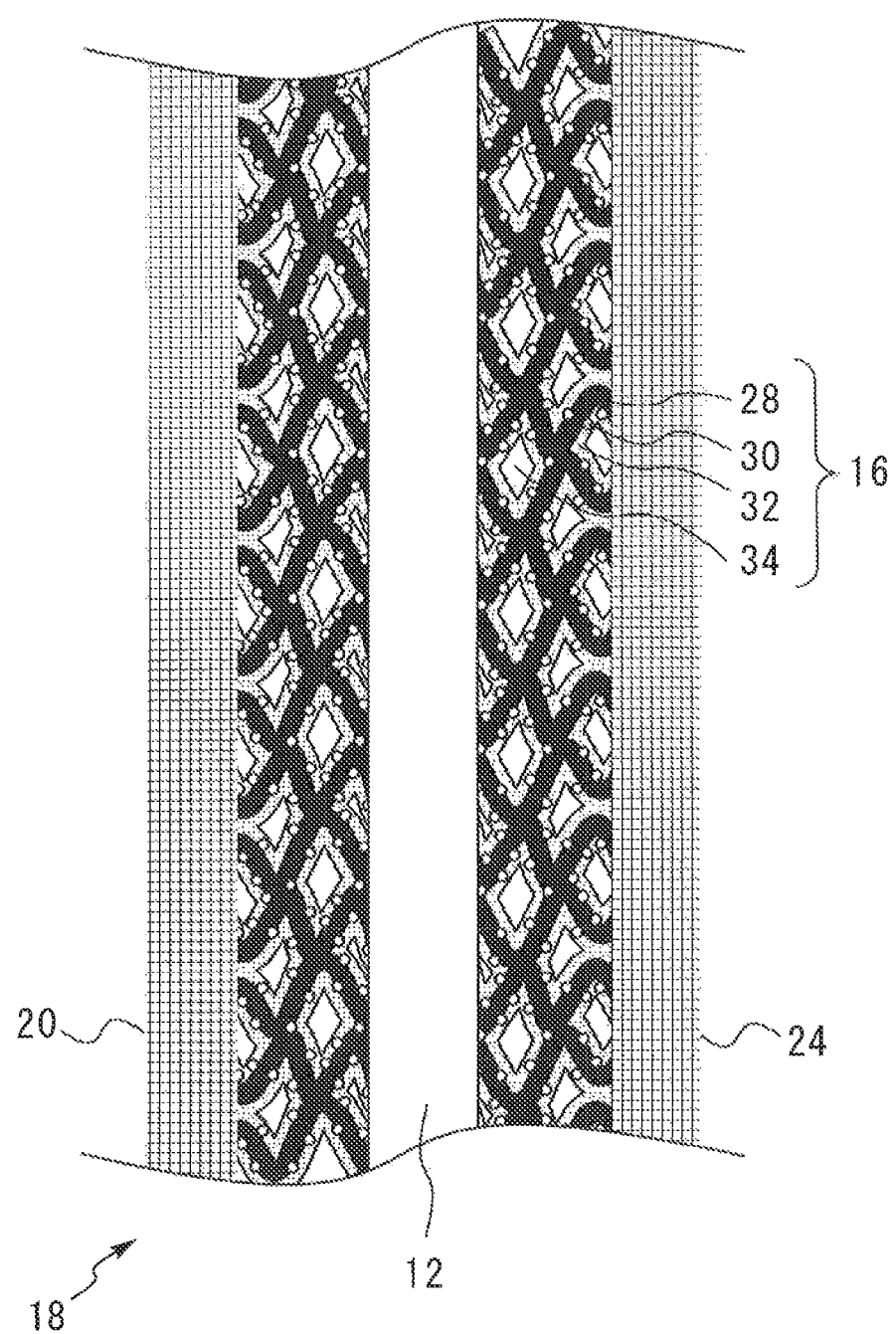
FIG. 2 is a schematic view showing a cross-sectional structure of the MEA 18 shown in FIG. 1.

Next, a specific structure of the MEA 18 will explained below with reference to FIGS. 2 and 3. FIG. 2 is a schematic view showing a cross-sectional structure of the MEA 18 shown in FIG. 1. Incidentally, a structure of the anode electrode 14 is basically the same as that of the cathode electrode 16. Accordingly, only the structure of the cathode electrode 16 will be explained with reference to FIG. 2. As shown in FIG. 2, a plurality of CNTs 28 are provided on the surface of the electrolyte membrane 12. Each CNT 28 is a spiral CNT and is in contact with the adjacent CNT 28 on at least one portion of the outer circumference of the spiral. The CNTs 28 are mutually supported and disposed substantially vertical to the planar direction of the electrolyte membrane 12. Here, being substantially vertical to the planar direction of the electrolyte membrane 12 means that an angle between the planar direction of the electrolyte membrane 12 and a direction of a straight line connecting central parts on both ends of the CNT 28 is 90 degrees±10 degrees. This means the angle is not necessarily 90 degrees depending on manufacturing conditions or the like. The CNTs 28 are arranged as described above to form one layer as a whole.

As shown in FIG. 2, electrode catalysts 30 are provided on the outer surfaces of the CNTs 28. The electrode catalysts 30 are made of platinum. Instead, the electrode catalysts 30 may be made of particles of metal such as ruthenium, iridium, rhodium, palladium, osmium, tungsten, lead, iron, chrome, cobalt, nickel, manganese, vanadium, molybdenum, gallium and aluminum, or their alloys.

As shown in FIG. 2, ionomers 32 are provided to cover the CNTs 28 and the electrode catalysts 30 on the outer surfaces of the CNTs 28 that are vertically disposed. The ionomers 32 are made of polymer electrolyte having higher glass transition temperature than that of polymer electrolyte used for the electrolyte membrane 12. Similarly to the electrolyte membrane 12, the ionomers 32 are formed from perfluorosulfonic acid resin, for example. A minute space 34 is formed between the CNT 28 covered with the ionomers 32 and the adjacent CNT 28. The space 34 can be used as a path for gas necessary for electrochemical reaction and a path for discharging water generated by the electrochemical reaction.

Figure 3:
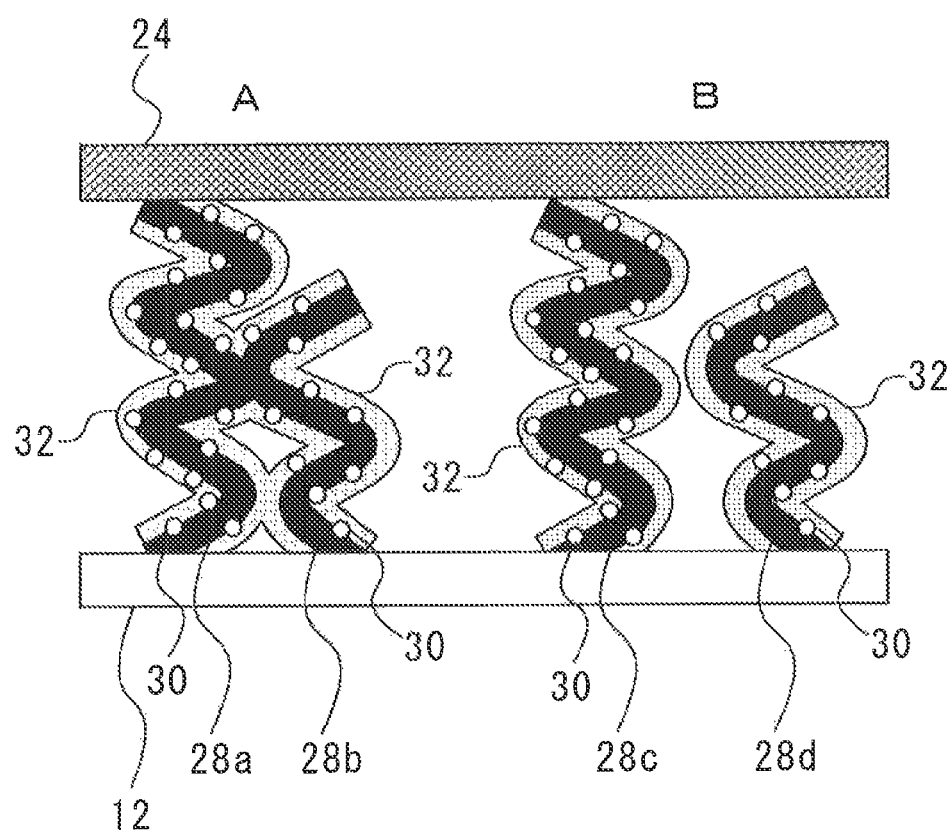
FIG. 3 is an illustration for explaining a structure in the vicinity of the CNTs 28 shown in FIG. 2.

FIG. 3 is an illustration for explaining a structure in the vicinity of the CNTs 28 shown in FIG. 2. As shown in FIG. 3A, the CNT 28a and the CNT 28b are in contact with each other on their spiral outer circumferences. Thus, they are mutually supported and their alignment properties can be maintained. One end of the CNT 28b is buried only on the electrolyte membrane 12 side, while ends of the CNT 28a are buried in both the electrolyte membrane 12 and the GDL 24. Thus, the CNT 28b and the GDL 24 can be electrically connected via the CNT 28a. As understood from FIG. 3B for comparison, the CNT 28d and the GDL 24 are not electrically connected when the CNT 28c and the CNT 28d are separately disposed. Thus, a current cannot flow through the CNT 29d and therefore the function of the electrode catalysts 30 carried by the CNT 28d cannot be used.

[Method for Manufacturing MEA and Fuel Cell]

Next, each process of the method for manufacturing the MEA 18 and the fuel cell 10 which are configured as described above will be explained below with reference to FIG. 4. In the first embodiment, the MEA 18 and the fuel cell 10 are manufactured in a seed catalyst layer forming process (1), a CNT growing process (2), a CNT entanglement promoting process (3), a catalyst carrying process (4), an ionomer arranging process (5), and a transferring (MEA conversion) process (6). These processes will be explained below in detail.

Seed Catalyst Layer Forming Process (1)

This process is a process for forming a seed catalyst layer carrying a seed catalyst metal (catalyst for growth) on a. CNT substrate (steps 100 to 140). Firstly, a paste prepared by mixing a metal and the like for forming a base material of the seed catalyst layer and a metal salt solution for forming a precursor of the seed catalyst metal is applied onto the CNT substrate (step 100). As the CNT substrate, a heat-resistant substrate such as a silicon substrate, a titanium substrate, and a stainless substrate may be used. The surface of the CNT substrate can be cleaned as needed. A method for cleaning the CNT substrate may be a heating treatment in a vacuum.

The paste applied onto the CNT substrate can be prepared by mixing and diffusing a disperse liquid of a porous metal or the like as the base material of the seed catalyst layer and the metal salt solution as the precursor of the seed catalyst metal in alcohol such as ethanol. As the metal or the like as the base material of the seed catalyst layer, a porous metal oxide such as alumina ($Al_2O_3$), zirconia ($ZrO_2$), and titania ($TiO_2$), a porous half-metal oxide such as silica ($SiO_2$), or a metal porous material such as iron, nickel, copper, and aluminum may be used. An example of the metal salt solution as the precursor of the seed catalyst metal includes a salt solution of metal such as iron, nickel, cobalt, manganese, molybdenum, and palladium. One of them may be used or they may be simultaneously used.

A method for applying the paste is not particularly limited. Various applying methods such as a spray method, a screen printing, a doctor blade method, and an inkjet method may be used.

Subsequently, solvent in the paste is dried and removed in this process (step 120). Specifically, the seed catalyst layer is dried at 80° C. for 24 hours. Therefore, the seed catalyst metal in a state of oxide of approximately a few nm is carried on the surface of the seed catalyst layer. More preferably, the paste is applied again after the seed catalyst layer is dried at 80° C. for 1 hour, and then dried at 80° C. for 24 hours. Accordingly, a surface area of the seed catalyst layer for carrying the seed catalyst metal can be increased and therefore a large amount of seed catalyst metal can be carried. A temperature and time for drying the seed catalyst layer can be appropriately changed depending on a boiling point of the solvent, a membrane thickness of the formed seed catalyst layer and the like.

Next, the seed catalyst layer is heated in a flow of reducing gas, and the seed catalyst metal in the oxide state is reduced in this process (step 140). Specifically, the temperature of the seed catalyst layer is increased to approximately 800° C. in hydrogen-mixed inert gas. As described above, the seed catalyst layer is made of the porous metal oxide and the like and therefore its surface area is increased. Thus, when the temperature is increased, the seed catalyst metal can be carried with high density without being sintered to be enlarged.

CNT Growing Process (2)

This process is a process for growing a spiral CNT which is substantially vertical to a planar direction of the seed catalyst layer using a chemical vapor deposition method (CVD method) (step 160). Here, being substantially vertical to the planar direction of the seed catalyst layer means that an angle between the planar direction of the seed catalyst layer and a direction of a straight line connecting central parts on both ends of the CNT is 90 degrees±10 degrees.

In this process, the seed catalyst layer is positioned within a space in inert atmosphere, and raw material gas is supplied to the seed catalyst layer while the seed catalyst layer is heated at a predetermined temperature (usually approximately 700° C.) suitable for growth of the CNT. Accordingly, the spiral CNT is formed to be disposed substantially vertical to the planar direction of the seed catalyst layer around the seed catalyst metal. For example, carbon source gas such as methane, ethylene, acetylene, benzene and alcohol may be used as the supplied raw material gas.

A flow rate, a supply time, a total supply amount of the raw material gas and the like are not particularly limited. They can be appropriately determined in consideration of a tithe length and a tube diameter of the CNT to be targeted, a shape of the CNT or the like. For example, the tube length and the tube diameter of the growing CNT and the shape of the CNT can be designed from a concentration of the supplied raw material gas [raw material gas flow rate/(raw material gas flow rate+ inert gas flow rate)].

In this process, the CVD method is used in which the CNT is grown by bringing the seed catalyst metal and the raw material gas together at high temperature. However, the method for generating the CNT is not limited to the CM method. For example, a vapor growth method such as an arc discharge method and a laser deposition method, or other known synthetic methods may be used.

CNT Entanglement Promoting Process (3)

This process is a process for promoting the entanglement between adjacent CNTs by applying a pressure in the tube length direction of the grown spiral CNT (steps 180 to 220). In this process, two flat plates for fastening, are initially prepared and the CNT obtained in the CNT growing process (2) with the CNT substrate is sandwiched between the flat plates (step 180).

Subsequently, a constant pressure is applied for a certain period of time in this process (step 200). In the first embodiment, the pressure of 1 MPa to 5 MPa is applied as the constant pressure. However, the pressure of higher than 5 MPa may be applied to further strengthen the entanglement of the adjacent CNTs without impairing the alignment properties of the CNTs. In the first embodiment, this constant pressure is applied for, for example, 24 hours. The applied time is varied depending on the shape of the CNT and the applied pressure. Thus, it is preferred that the applied time is appropriately set after the effect of the entanglement of the CNTs during the applied time is separately studied. Subsequently, the fastening is undone to release the pressure in this process (step 220), Catalyst Carrying Process (4)

This process is a process for causing the entangled CNTs to carry electrode catalysts (step 240). As a method for carrying the electrode catalysts, a method for applying a metal salt solution serving as the electrode catalysts 30 specifically illustrated in FIG. 2 to the CNT surface and then reducing it by heating it at 200° C. or more in a hydrogen atmosphere can be cited. The metal salt solution may be an aqueous solution or organic solvent solution. For applying the metal salt solution to the CNT surface, for example, a method for immersing the CNT in the metal salt solution, a method for dropping the metal salt solution to the CNT surface, or a method for spraying the metal salt solution to the CNT surface may be used.

When platinum is used for the electrode catalysts, a platinum salt solution prepared by dissolving an appropriate amount of chloroplatinic acid or platinum nitric acid solution (for example, a dinitrodiammine platinum nitric acid solution) in alcohol such as ethanol and isopropanol may be used as the metal salt solution. It is particularly preferred to used the platinum salt solution prepared by dissolving a dinitrodiammine platinum nitric acid solution in alcohol because platinum can be uniformly carried on the CNT surface.

Figure 5:
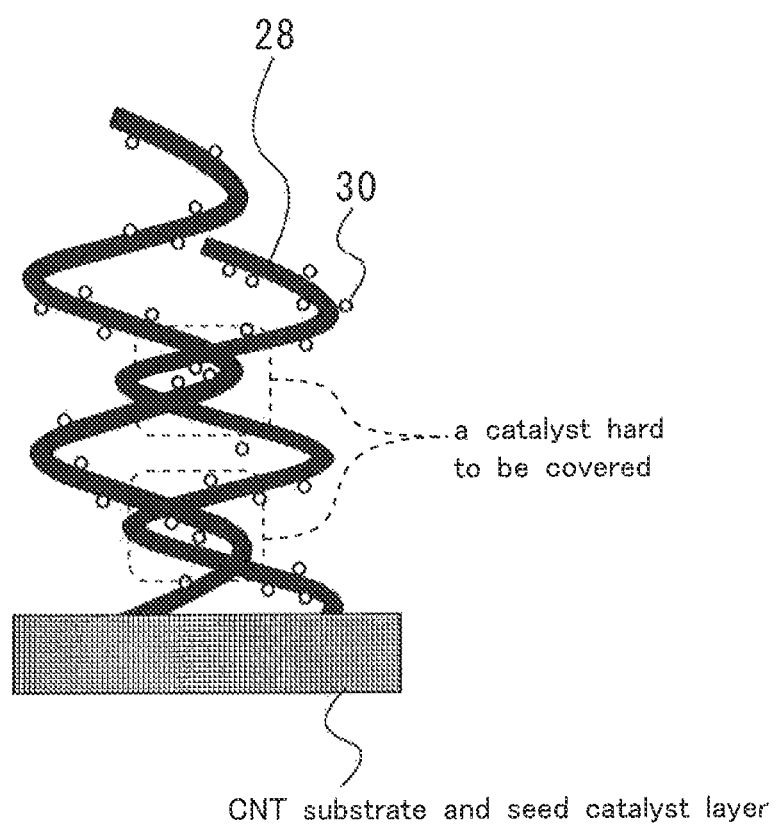
FIG. 5 is a schematic view of the CNTs carrying the catalysts obtained when the order of the CNT entanglement promoting process (3) and this process is reversed for comparison of the first embodiment.

In the first embodiment, this process is carried out after the CNT entanglement promoting process (3). The reason for carrying out this process in this order will be explained below with reference to FIG. 5. FIG. 5 is a schematic view of the CNTs carrying the catalysts obtained when the order of the CNT entanglement promoting process (3) and this process is reversed for comparison of the first embodiment. When the CNT entanglement promoting process (3) is carried out after this process, the electrode catalysts are carried on portions where the CNTs are entangled as shown in portions surrounded by dashed lines in FIG. 5. When the portions where the electrode catalysts are carried are small, a later-described ionomer solution becomes difficult to sufficiently reach. Thus, the electrode catalysts cannot be sufficiently covered by the ionomer solution.

By carrying out this process after the CNT entanglement promoting process (3) in the first embodiment, the compressed entanglement structure of the CNTs is produced in advance, and then the electrode catalysts can be carried. Accordingly, the electrode catalysts can be carried on portions where the ionomer solution is easily reached. Thus, the electrode catalysts can be reliably covered by the ionomers and therefore the ratio of utilization of the catalysts can be enhanced.

Ionomer Arranging Process (5)

This process is a process for arranging the ionomers on the surface of the CNT carrying the electrode catalysts (step 260). Specifically, the CNT carrying the electrode catalysts is immersed in the ionomer solution and then removed to arrange the ionomers on the surface of the CNT. Therefore, the entanglement structure of the CNT produced in the CNT entanglement promoting process (3) can be strengthened. Incidentally, after the CNT is removed, the CNT may be dried to remove a solvent, or may be depressurized and degassed to remove bubbles remaining between the ionomer formation surface and the CNT surface. Thus, the ionomers can be uniformly arranged on the CNT surface. The solvent and bubbles may be removed simultaneously in the later-described transferring process (6), or after the transferring process (6).

It is preferred, in order to arrange the ionomers, the amount of ionomers is adjusted such that a weight ratio relative to carbon forming the CNT (hereinafter referred to as "I/C") is 1.6 to 3.5. The ionomers can function as a path for protons and also function as a reinforcement material in the tube length direction of the CNT. Thus, it is preferred that I/C is 1.6 or more to sufficiently exert the reinforcement function. When I/C is 3.5 or more, a gap formed between the adjacent CNTs is clogged by the ionomers and as a result unfavorably causes the gas diffusivity and drainage performance to be reduced. Incidentally, I/C can be set with reference to the weight of carbon before and after the CNT growing process (2).

Transferring (MEA Conversion) Process (6)

This process is a process for transferring the CNT layer on which the ionomers are disposed onto both sides of the electrolyte membrane (steps 280, 300). Firstly, the electrolyte membrane and the growing end of the CNT are disposed opposite to each other, and the electrolyte membrane is tightly attached and joined to the CNT in this process (step 280). Thus, a CNT substrate-CNT layer-electrolyte membrane assembly can be produced. The electrolyte membrane is tightly attached while being heated at its melting temperature or more. However, the electrolyte membrane is not heated at excessive temperature at which the membrane deterioration is caused and the proton conductivity is reduced. For example, when perfluorocarbon sulfonic acid resin is used for the electrolyte membrane, the electrolyte membrane is heated at 100 to 160° C. to be tightly attached to the CNT. The pressure of 5 MPa to 15 MPa is applied between the CNT layer and the electrolyte membrane to strengthen the adhesiveness when the electrolyte membrane is joined.

Subsequently, the CNT substrate and the CNT layer-electrolyte membrane assembly are separated from each other in this process (step 300). Specifically, the CNT substrate side is immersed in an acid or alkaline solution to dissolve and remove the seed catalyst layer or the seed catalyst metal formed on the CNT substrate. The acid or alkaline solution can be appropriately selected corresponding to chemical properties of materials used for the base material of the seed catalyst layer or the seed catalyst metal. Incidentally, the CNT substrate and the CNT layer-electrolyte membrane assembly may be separated from each other by physically peeling them. In the process as described above, the spiral ENT is in contact with the adjacent CNT on at least one portion of the outer circumference. They are mutually supported to manufacture the MBA disposed to be substantially vertical to the planar direction of the electrolyte membrane. By sandwiching the MBA manufactured as described above between the above-described GDLs and the separators, the fuel cell 10 can be manufactured.

[Verification Test and its Result]

Figure 6:
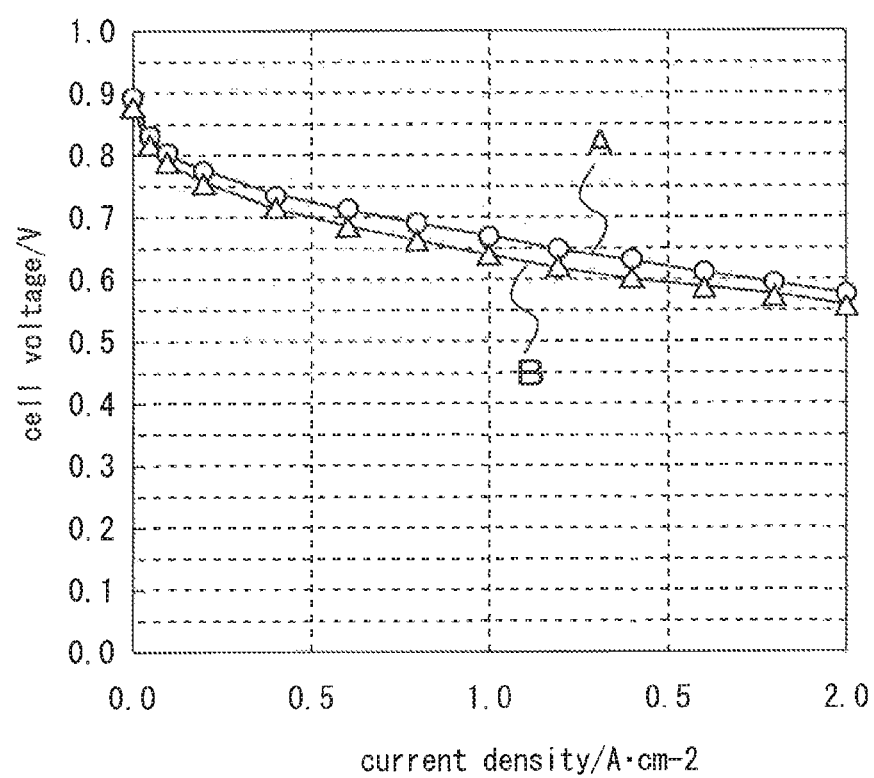
FIG. 6 shows I-V properties of the MEA.
Figure 7:
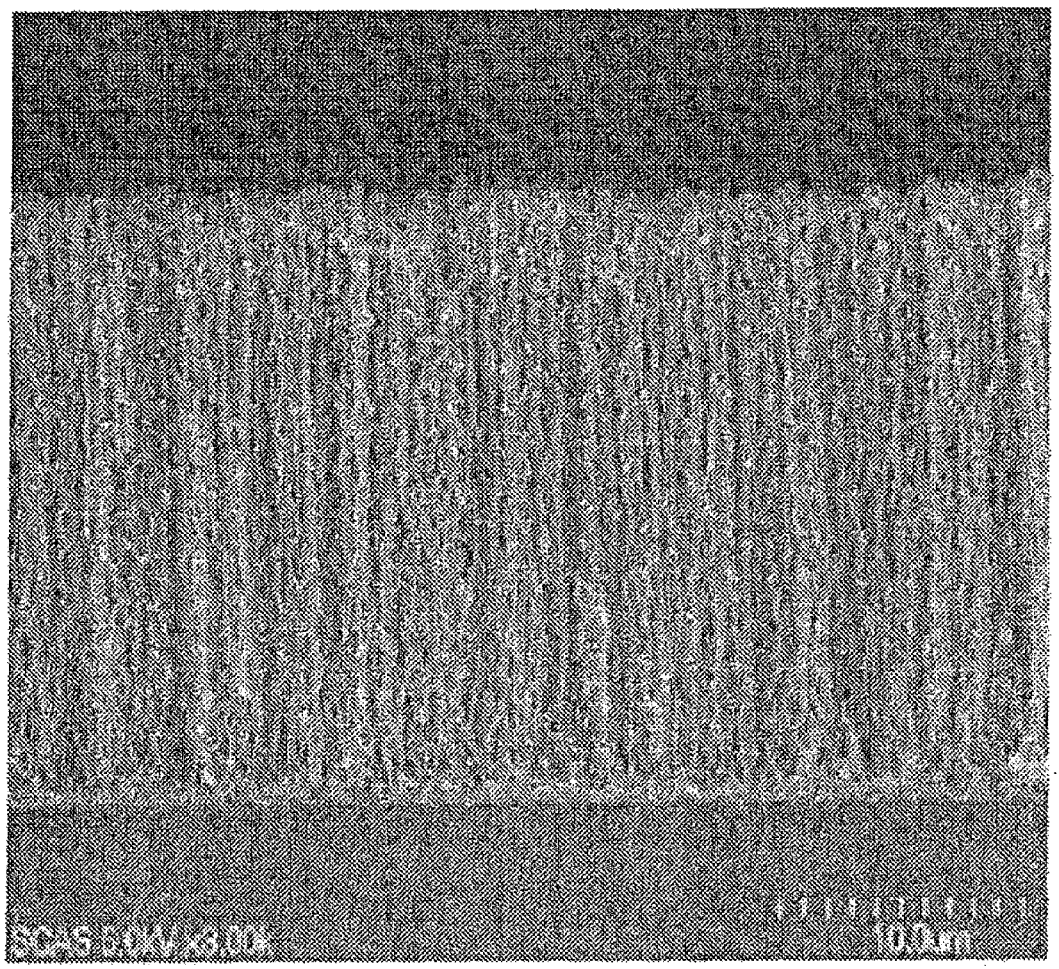
FIG. 7 is a SEM image of the spiral CNT used in the test explained by FIG. 6 and FIG. 8.

FIG. 6 shows I-V properties of the MEA. FIG. 6A shows the I-V property of the MBA manufactured using the manufacturing method according to the first embodiment. Specifically, this MEA is manufactured by (i) applying a pressure (2 MPa) equal to a cell tightening pressure to a spiral CNT shown in FIG. 7 for 24 hours, (ii) carrying platinum and ionomer in this order after releasing the pressure, and (iii) hot-pressing the electrolyte membrane. On the other hand, FIG. 6B shows the I-V property of the MEA for comparison which is manufactured using a conventional manufacturing method. This MBA for comparison is manufactured using the CNT shown in FIG. 7 by the same manufacturing method as that according to the first embodiment except that the above-described process (i) is not carried out.

As shown in FIG. 6, an output of the MEA manufactured by the manufacturing method according to the first embodiment is considerably improved as compared to the MEA for comparison manufactured by the conventional manufacturing method. Consequently, it is proven that the CNT entanglement can be promoted and thus the fuel cell output can be improved by the manufacturing method according to the first embodiment.

Figure 8:
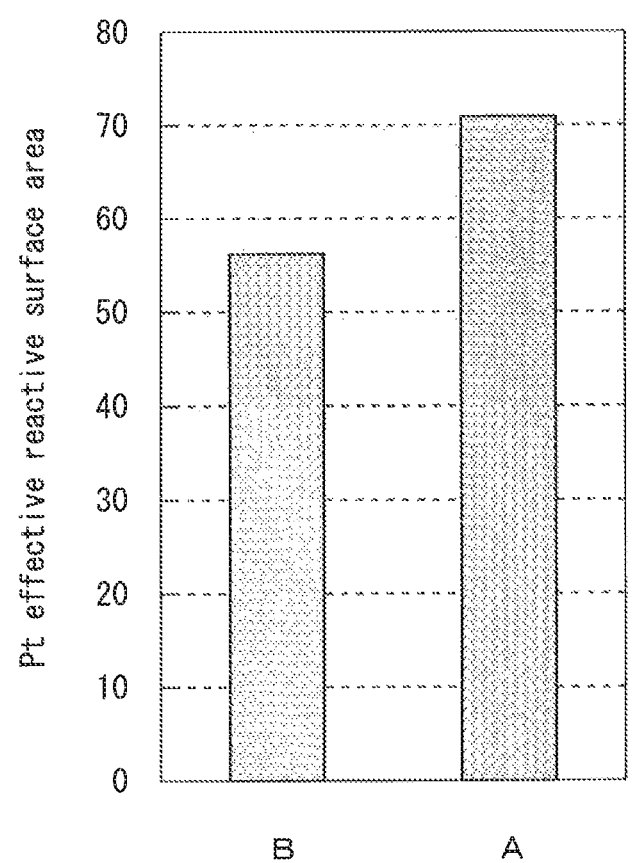
FIG. 8 is a graph showing an effective reactive surface area of platinum in a CNT carrying the platinum.

FIG. 8 is a graph showing an effective reactive surface area ($cm^2/mg$) of platinum in a CNT carrying the platinum. FIG. 8A shows an effective reactive surface area of a CNT carrying platinum which is manufactured based on the manufacturing method according to the first embodiment. Specifically, this CNT carrying the platinum is manufactured by (i) applying a pressure (2 MPa) equal to the cell tightening pressure to the CNT shown in FIG. 7 for 24 hours, and (ii) carrying the platinum after releasing the pressure. On the other hand. FIG.

8B shows an effective reactive surface area of a CNT carrying platinum for comparison which is manufactured by a conventional manufacturing method. The CNT carrying the platinum for comparison is manufactured using the CNT shown in FIG. 7 by carrying the platinum without carrying out the above-described process (i). The effective reactive surface area is calculated by obtaining an adsorption electrical quantity of the CNT carrying, the platinum using cyclic voltammetry.

As shown in FIG. 8, the effective reactive surface area of the CNT carrying the platinum manufactured based on the manufacturing method according to the first embodiment is increased by 27% as compared to the CNT carrying the platinum for comparison manufactured using the conventional manufacturing method. Consequently, it is proven that the CNT entanglement can be promoted by the manufacturing method according to the first embodiment and thus the rate of utilization of platinum can be enhanced.

Thus, the entanglement between the adjacent CNTs can be promoted by the CNT entanglement promoting process (3) and the electrical connection of the CNTs can be ensured by the manufacturing method according to the first embodiment, so that the fuel cell output can be improved. Also, by carrying out the CNT entanglement promoting process (3) before the catalyst carrying process (4), the electrode catalysts can be carried after the CNT entanglement structure is produced. Then, the carried electrode catalysts can be reliably covered with the ionomers in the ionomer arranging process (5) and thus the ratio of utilization of the catalysts can be enhanced.

Incidentally, the CNT 28 is spiral in the first embodiment. However, the CNT 28 may be corrugated. In other words, the shape of the CNT 28 is not particularly limited as long as a connection point can be formed between the adjacent CNTs to be substantially vertical to the planar direction of the electrolyte membrane 12 when the pressure is applied in the tube length direction of the CNT. This modification is similarly applicable to a later-described second embodiment.

In the first embodiment, the anode electrode 14 and the cathode electrode 16 have the structures as shown in FIG. 2. However, both of them do not necessarily have such structures shown in FIG. 2. For example, a known electrode (for example, carbon particles carrying electrode catalysts and covered with ionomers) may be used instead of the anode electrode 14 in FIG. 2. As long as at least one electrode has the structure shown in FIG. 2, the substantially same effect as the effect of this embodiment can be obtained. This modification is similarly applicable to the later-described second embodiment.

Further, the CNT entanglement promoting process (3) is carried out before the catalyst carrying process (4) in the first embodiment. However, this order of these processes may be changed. By carrying out the CNT entanglement promoting process (3), the entanglement between at least adjacent CNTs can be promoted. Accordingly, it is expected that the fuel cell output can be improved by ensuring the electrical connection between the CNTs. Thus, it is not required that the catalyst carrying process (4) is carried out after the CNT entanglement promoting process (3). The catalyst carrying process (4) may be carried out before the CNT entanglement promoting process (3).

In the first embodiment, the constant pressure is applied in the CNT entanglement promoting process (3). However, a high pressure (for example, 3 to 5 MPa) and a low pressure (for example, 0 to 1 MPa) may be alternately applied. When the applied pressure is varied, a state of entanglement of the CNTs can be confirmed when the low pressure is applied. Thus, as compared with when the constant pressure is applied, variation in products can be reduced.

Figure 4:
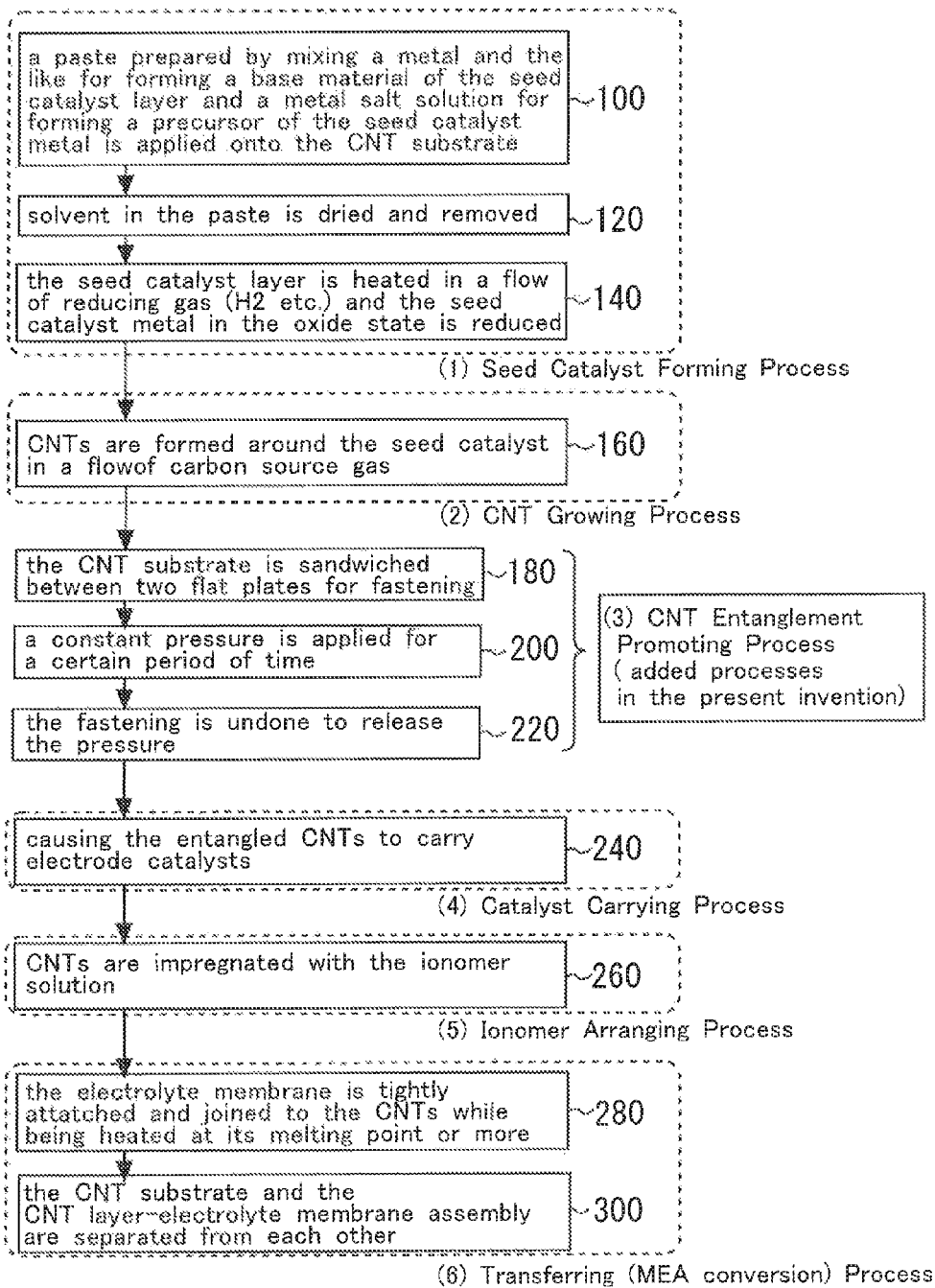
FIG. 4 is an illustration for explaining each process of the method for manufacturing the fuel cell of the first embodiment.

In the above-described first embodiment, the steps 100 to 160 as shown in FIG. 4 correspond to a "carbon nanotube preparing step" according to the first aspect of the invention, the steps 180 to 200 as shown in FIG. 4 correspond to a "second pressure applying step" according to the first aspect of the invention, the step 240 as shown in FIG. 4 corresponds to a "catalyst carrying step" according to the first aspect of the invention, the step 260 as shown in FIG. 4 corresponds to an "ionomer arranging step" according to the first aspect of the invention, the step 280 as shown in FIG. 4 corresponds to a "first pressure applying step" according to the first aspect of the invention, and the step 300 as shown in FIG. 4 corresponds to a "base material removing step" according to the first aspect of the invention.

Second Embodiment

Figure 9:
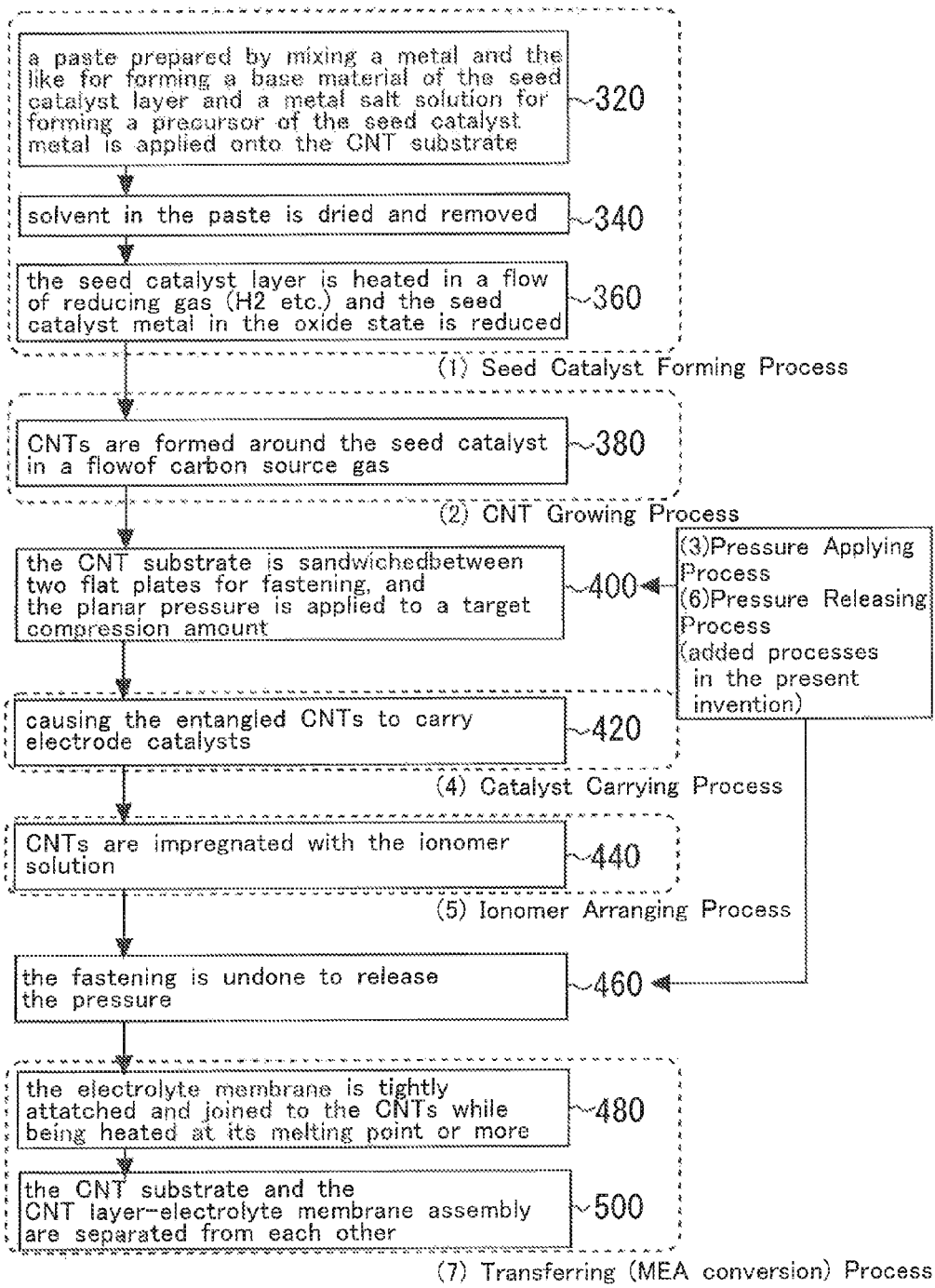
FIG. 9 is an illustration for explaining each process of the method for manufacturing the fuel cell of the second embodiment.
Figure 10:
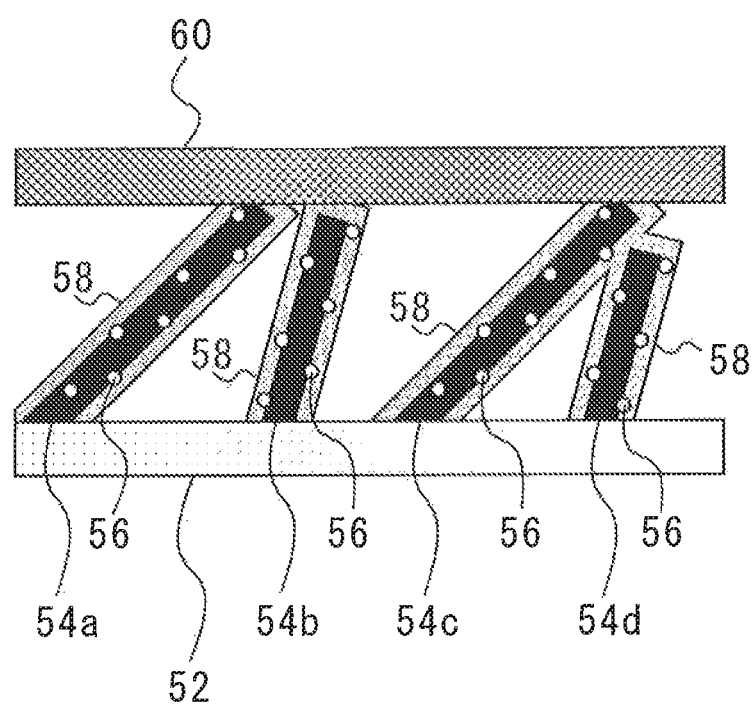
FIG. 10 is an illustration for explaining an electrode structure of the fuel cell obtained by the first method disclosed in Patent Literature 2.

Next, the second embodiment of the present invention will be explained below with reference to FIG. 9. In the first embodiment, the entanglement of the spiral CNTs is promoted through the steps 180 to 220 as shown in FIG. 4. However, in a manufacturing method according to the second embodiment, the entanglement of the CNTs is promoted through later-described steps 400 and 460 as shown in FIG. 9 differently from the first embodiment. Incidentally, a structure of a fuel cell manufactured in the second embodiment is the same as the fuel cell 10 shown in FIG. 1. Thus, the description of the structure thereof is omitted.

[Method for Manufacturing MEA and Fuel Cell]

In the second embodiment, the MEA 18 and the fuel cell 10 are manufactured by a seed catalyst layer forming process (1), a CNT growing process (2), a pressure applying process (3), a catalyst carrying process (4), an ionomer arranging process (5), a pressure releasing process (6), and a transferring (MEA conversion) process (7). These processes will be explained below in detail.

Seed Catalyst Layer Forming Process (1) and CNT Growing Process (2)

The seed catalyst layer forming process (1) is a process for forming a seed catalyst layer carrying, a seed catalyst metal (catalyst for growth) on a CNT substrate (steps 320 to 360). Further, the CNT growing process (2) is a process for growing a spiral CNT to be substantially vertical to the planar direction of the seed catalyst layer using a chemical vapor deposition method (CVD method) (step 380). These processes are the same as the steps 100 to 160 as shown in FIG. 4. Thus, the detailed description thereof is omitted.

Pressure Applying Process (3)

This process is a process for applying a pressure in the tube length direction of the grown spiral CNT (step 400). Specifically, two flat plates for fastening are prepared and the CNT obtained in the CNT growing process (2) with a CNT substrate is sandwiched between the flat plates. Then, the planar pressure (usually the pressure of 1 MPa to 10 MPa) is applied to a target compression amount. Thus, the adjacent CNTs are entangled.

Catalyst Carrying Process (4) and Ionomer Arranging Process (5)

The catalyst carrying process (4) is a process for causing the entangled CNT to carry electrode catalysts (step 420). Also, the ionomer arranging process (5) is a process for arranging ionomers on the surface of the CNT carrying the electrode catalysts (step 440). These processes are different from the steps 240 and 260 shown in FIG. 4 in that they are carried out without releasing the pressure applied in the pressure applying process (3), but are the same as the steps 240 and 260 in the other respects. Incidentally, in the ionomer arranging process (5), the solvent and bubbles may be removed similarly to the first embodiment. They may be removed simultaneously with the pressure releasing process (6) and the transferring process (7) as described later, or may be after these processes.

In the first embodiment, the constant pressure is applied for a certain period of time to secure the entanglement of the CNTs in the CNT entanglement promoting process (3) (steps 180 to 220 shown in FIG. 4). On the other hand, in the second embodiment, the ionomer arranging process (5) is carried out while the compression state of the CNTs is maintained after the pressure applying process (3) so as to secure the entanglement of the CNT by the ionomers. Thus, in the second embodiment, the entanglement of the CNTs can be secured for a short time as compared to the first embodiment.

Pressure Releasing Process (6) and Transferring (MEA Conversion) Process (7)

The pressure releasing process (6) is a process for releasing the pressure applied in the pressure applying process (3) (step 460). The transferring process (7) is a process for transferring the CNT layer onto both sides of the electrolyte membrane after the pressure releasing process (6) (steps 480, 500). The transferring process (7) is the same as the steps 280 and 300 shown in FIG. 4. Thus, the detailed description thereof is omitted.

By the manufacturing method according to the second embodiment as described above, the ionomer arranging process (5) is carried out while the compression state of the CNTs is maintained after the pressure applying process (3). Accordingly, the electrical connection of the grown CNTs can be ensured and the entanglement structure of the CNTs can be secured for a short time. Thus, the productivity can be improved in addition to the effects of the first embodiment.

Incidentally, in the second embodiment, the pressure applying process (3) is carried out before the catalyst carrying process (4). However, this order of these processes may be changed. Similarly to the first embodiment, at least adjacent CNTs can be entangled by carrying out the pressure applying process (3). Accordingly, it is expected that the fuel cell output can be improved by ensuring the electrical connection between the CNTs. Thus, the catalyst carrying process (4) is not necessarily carried out after the pressure applying process (3). The pressure applying process (3) may be carried out after the catalyst carrying process (4).

DESCRIPTION OF REFERENCE NUMERALS 10 fuel cell
12 electrolyte membrane
14 anode electrode
16 cathode electrode
18 MEA
20, 24 GDL
22, 26 separator
28 CNT
30 electrode catalysts
32 ionomers
34 minute space

The invention claimed is:

1. A method for manufacturing a membrane electrode assembly comprising:
a carbon nanotube preparing step for preparing a plurality of carbon nanotubes which are grown to be vertical to a planar direction of a base material;
a catalyst carrying step for causing the carbon nanotubes to carry catalysts after the carbon nanotube preparing step;
an ionomer arranging step for arranging ionomers on surfaces of the carbon nanotubes to cover the catalysts and the carbon nanotubes after the catalyst carrying step;
a first pressure applying step for applying a first pressure required for connecting the carbon nanotubes and a solid polymer electrolyte membrane therebetween by placing growing ends of the carbon nanotubes and the solid polymer electrolyte membrane to be opposite to each other after the catalyst carrying step or the ionomer arranging step; and
a base material removing step for removing the base material after the first pressure applying step;
wherein:
the method for manufacturing a membrane electrode assembly further comprising:
a second pressure applying step for applying a second pressure required for forming a connecting point between two adjacent carbon nanotubes out of the carbon nanotubes in a tube length direction of the carbon nanotubes after the carbon nanotube preparing step and at least before the first pressure applying step.

2. The method for manufacturing the membrane electrode assembly according to claim 1, wherein the second pressure applying step is carried out after the carbon nanotube preparing step and before the catalyst carrying step.

3. The method for manufacturing the membrane electrode assembly according to claim 2, wherein the second pressure is released after a set time which is predetermined as a time required for securing the formed connecting point.

4. The method for manufacturing the membrane electrode assembly according to claim 1, wherein the second pressure applying step is a step for applying the second pressure and a pressure lower than the second pressure alternately in the tube length direction.

5. The method for manufacturing the membrane electrode assembly according to claim 1, wherein the second pressure is released after the ionomer arranging step.

6. The method for manufacturing the membrane electrode assembly according to claim 1, wherein each of the carbon nanotubes has a spiral structure with the tube length direction as an axis.

* * * * *